(12) United States Patent
Zhang

(10) Patent No.: US 10,656,098 B2
(45) Date of Patent: May 19, 2020

(54) WAFER DEFECT INSPECTION AND REVIEW SYSTEMS

(71) Applicant: KLA-Tencor Corporation, Milpitas, CA (US)

(72) Inventor: Shiyu Zhang, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/279,053

(22) Filed: Sep. 28, 2016

(65) Prior Publication Data

US 2017/0219807 A1 Aug. 3, 2017

Related U.S. Application Data

(60) Provisional application No. 62/290,586, filed on Feb. 3, 2016.

(51) Int. Cl.
*G01N 21/95* (2006.01)
*G02B 17/00* (2006.01)
*G02B 13/22* (2006.01)
*G02B 21/04* (2006.01)
*G02B 17/08* (2006.01)

(52) U.S. Cl.
CPC ......... *G01N 21/9501* (2013.01); *G02B 13/22* (2013.01); *G02B 17/004* (2013.01); *G02B 21/04* (2013.01); *G02B 17/0892* (2013.01)

(58) Field of Classification Search
CPC .......................... G02B 17/0828; G02B 17/008
USPC ....................................................... 382/149
See application file for complete search history.

(56) References Cited

U.S. PATENT DOCUMENTS

| 5,040,882 | A | * | 8/1991 | Markle | G02B 13/26 |
| | | | | | 355/43 |
| 5,071,240 | A | | 12/1991 | Ichihara et al. | |
| 5,726,671 | A | * | 3/1998 | Ansley | G02B 5/12 |
| | | | | | 320/119 |
| 6,626,542 | B2 | | 9/2003 | Baba et al. | |
| 6,894,834 | B2 | | 5/2005 | Mann et al. | |
| 7,177,099 | B2 | | 2/2007 | Mercado et al. | |
| 7,466,489 | B2 | | 12/2008 | Beder et al. | |
| 7,633,675 | B2 | | 12/2009 | Armstrong et al. | |
| 2004/0101210 | A1 | * | 5/2004 | Weinstein | G02B 21/002 |
| | | | | | 382/284 |

(Continued)

FOREIGN PATENT DOCUMENTS

WO 2009046137 A1 4/2009

OTHER PUBLICATIONS

U.S. Appl. No. 15/055,292, filed Feb. 3, 2016, Shiyu Zhang et al.

(Continued)

*Primary Examiner* — Justin P. Misleh
(74) *Attorney, Agent, or Firm* — Suiter Swantz pc llo

(57) ABSTRACT

Imaging objectives and inspection systems equipped with such imaging objectives are disclosed. The imaging objective may include a front objective configured to produce a diffraction limited intermediate image. The imaging objective may also include a relay configured to receive the intermediate image produced by the front objective. The relay may include three spherical mirrors positioned to deliver a projection of the intermediate image to a fixed image plane.

22 Claims, 5 Drawing Sheets

(56) References Cited

U.S. PATENT DOCUMENTS

| | | | |
|---|---|---|---|
| 2004/0114217 A1* | 6/2004 | Mann | G02B 17/0652 |
| | | | 359/366 |
| 2004/0125352 A1 | 7/2004 | Mercado | |
| 2004/0135984 A1* | 7/2004 | Suzuki | G02B 17/0657 |
| | | | 355/67 |
| 2006/0198018 A1 | 9/2006 | Shafer et al. | |
| 2006/0219930 A1 | 10/2006 | Lange | |
| 2007/0109520 A1* | 5/2007 | Whitney | G02B 27/0911 |
| | | | 355/67 |
| 2008/0117532 A1 | 5/2008 | Shafer | |
| 2009/0080068 A1 | 3/2009 | Ozawa | |
| 2010/0259817 A1* | 10/2010 | Jannard | G02B 3/14 |
| | | | 359/432 |
| 2011/0085179 A1 | 4/2011 | Mann et al. | |
| 2013/0083321 A1* | 4/2013 | Wack | G03F 1/84 |
| | | | 356/239.3 |
| 2014/0264051 A1* | 9/2014 | Kvamme | G02B 5/0891 |
| | | | 250/372 |
| 2015/0272433 A1* | 10/2015 | Wang | A61B 3/0075 |
| | | | 351/206 |

OTHER PUBLICATIONS

International Search Report dated May 11, 2017 for PCT/US2017/015660.
Extended European Search Report dated Aug. 2, 2019 for EP Application No. 17747984.7.

* cited by examiner

WAFER DEFECT INSPECTION AND REVIEW SYSTEMS

CROSS-REFERENCE TO RELATED APPLICATIONS

The present application claims the benefit under 35 U.S.C. § 119(e) of U.S. Provisional Application Ser. No. 62/290,586, filed Feb. 3, 2016. Said U.S. Provisional Application Ser. No. 62/290,586 is hereby incorporated by reference in its entirety.

The present application is related to co-pending U.S. patent application Ser. No. 15/055,292, filed Feb. 26, 2016. Said U.S. U.S. patent application Ser. No. 15/055,292 is hereby incorporated by reference in its entirety.

TECHNICAL FIELD

The disclosure generally relates to the field of inspection, and particularly to inspection of semiconductor devices.

BACKGROUND

Thin polished plates such as silicon wafers and the like are a very important part of modern technology. A wafer, for instance, may refer to a thin slice of semiconductor material used in the fabrication of integrated circuits and other devices. Other examples of thin polished plates may include magnetic disc substrates, gauge blocks and the like. While the technique described here refers mainly to wafers, it is to be understood that the technique also is applicable to other types of polished plates as well. The term wafer and the term thin polished plate may be used interchangeably in the present disclosure.

Wafers are subjects to defect inspections. Tools utilized to perform such inspections are expected to be efficient and effective. It is noted, however, that recent developments in large scale circuit integration and size reduction have challenged that expectation. That is, existing inspection tools are becoming less efficient and effective in detecting defects as that defects are becoming increasingly smaller.

Therein lies a need for improved inspection systems without the aforementioned shortcomings.

SUMMARY

The present disclosure is directed to an imaging objective. The imaging objective may include a front objective configured to produce an intermediate image. The imaging objective may also include a relay configured to receive the intermediate image produced by the front objective. The relay may include three spherical mirrors positioned to deliver a projection of the intermediate image to a fixed image plane.

A further embodiment of the present disclosure is directed to an inspection system. The inspection system may include a detector positioned at a fixed location within the inspection system. The inspection system may also include a front objective configured to produce a diffraction limited intermediate image. The inspection system may further include a relay configured to receive the intermediate image produced by the front objective. The relay may include three spherical mirrors positioned to deliver a projection of the intermediate image to the detector positioned at the fixed location.

An additional embodiment of the present disclosure is directed to an imaging objective. The imaging objective may include a front objective configured to produce a diffraction limited intermediate image. The imaging objective may also include a relay configured to receive the intermediate image produced by the front objective. The relay may include three spherical mirrors positioned to deliver a projection of the intermediate image to a fixed image plane. The three spherical mirrors may be all reflective mirrors with substantially no obscuration, and may be configured to have different curvatures with respect to each other.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Embodiments in accordance with the present disclosure are directed to imaging objectives and inspection systems equipped with such imaging objectives. An imaging objective configured in accordance with the present disclosure may feature a perfect (e.g., diffraction limited) or imperfect intermediate image and a three-mirror all reflective relay. An imaging objective configured in this manner may serve as an alternative to the imaging objective described in U.S. Pat. No. 6,894,834 (which is hereby incorporated by reference in its entirety). It is noted that the imaging objective described in U.S. Pat. No. 6,894,834 does not provide diffraction limited performance at an intermediate image plane, making it impossible to be used for confocal applications. It is contemplated that imaging objectives configured in accordance with embodiments of the present disclosure may be utilized as a baseline design for future broadband imaging objectives.

Figure 1:
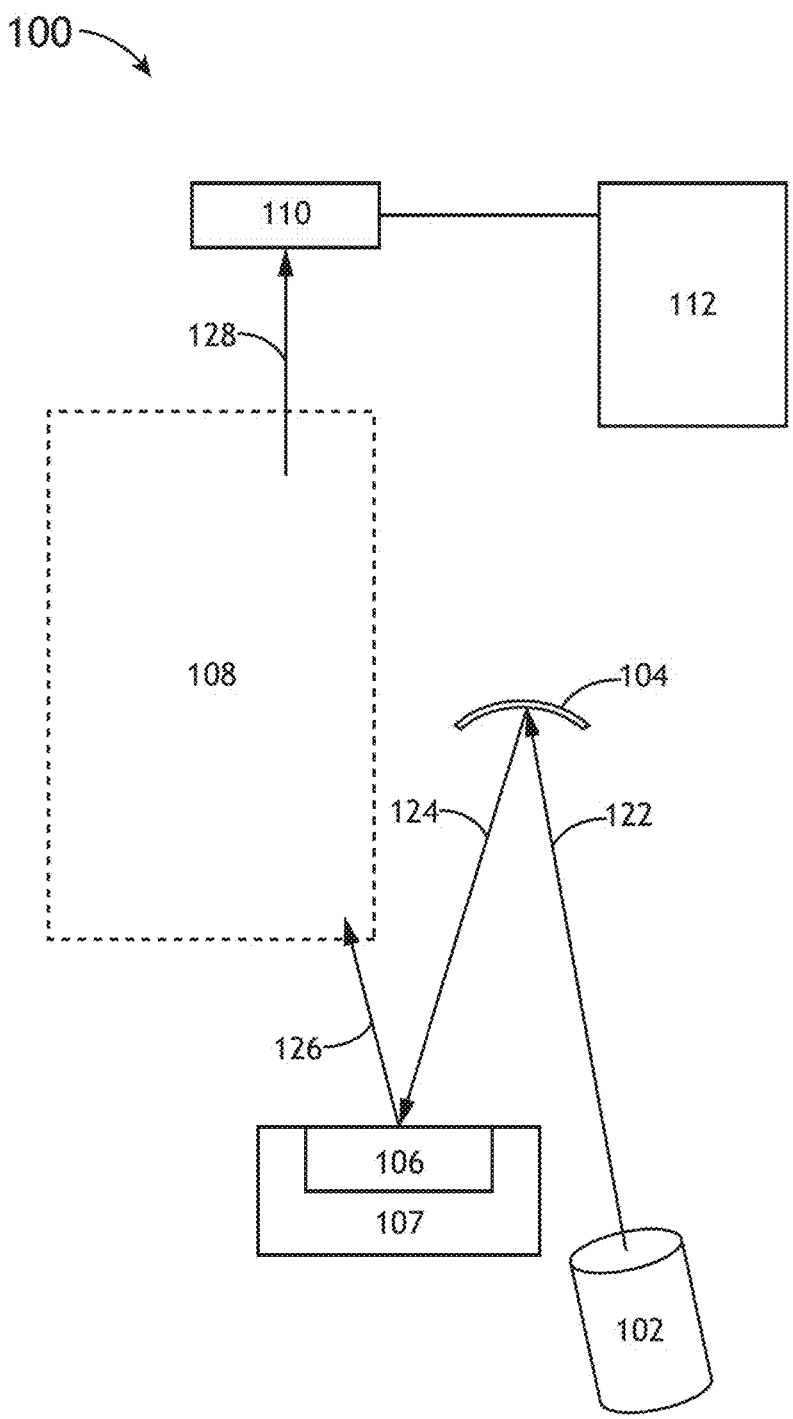
FIG. 1 is a block diagram depicting an inspection system configured in accordance with an embodiment of the present disclosure.

Referring generally to FIG. 1, a block diagram depicting an inspection system 100 configured in accordance with an embodiment of the present disclosure is shown. The inspection system 100 may include an illumination source 102, an illumination mirror (or a lens system) 104, a target substrate 106, a substrate holder 107, an imaging objective 108, a sensor (detector) 110, and a data processor 112.

The illumination source 102 may include, for example, a laser-induced plasma source, which can output a light beam 122. The illumination mirror 104 may reflect and direct the light beam 122 such that an incident beam 124 may be provided toward the target substrate 106. The target substrate 106 (e.g., a wafer) may then be scanned under the beam 124 by controllably translating the substrate holder 107 so that the field of view (FOV) of the inspection system 100 can cover regions on the substrate to be inspected. Consequently, output light 126 may be reflected from the target substrate 106 to the imaging objective 108, which may then output a projection 128 of the output light onto the sensor 110.

The sensor 110 may include one or more charged coupled devices (CCD), CCD arrays, time delay integration (TDI) sensors, TDI sensor arrays, photomultiplier tubes (PMT), as well as various other types of optical sensing devices. The signals captured by the sensor 110 may be provided to the data processor 112 for additional processing. In some embodiments, the data processor 112 may be configured to analyze intensity, phase, and/or other characteristics of the sensed light beam. The data processor 112 may also be configured to provide the analysis results to one or more systems or users.

Figure 2:
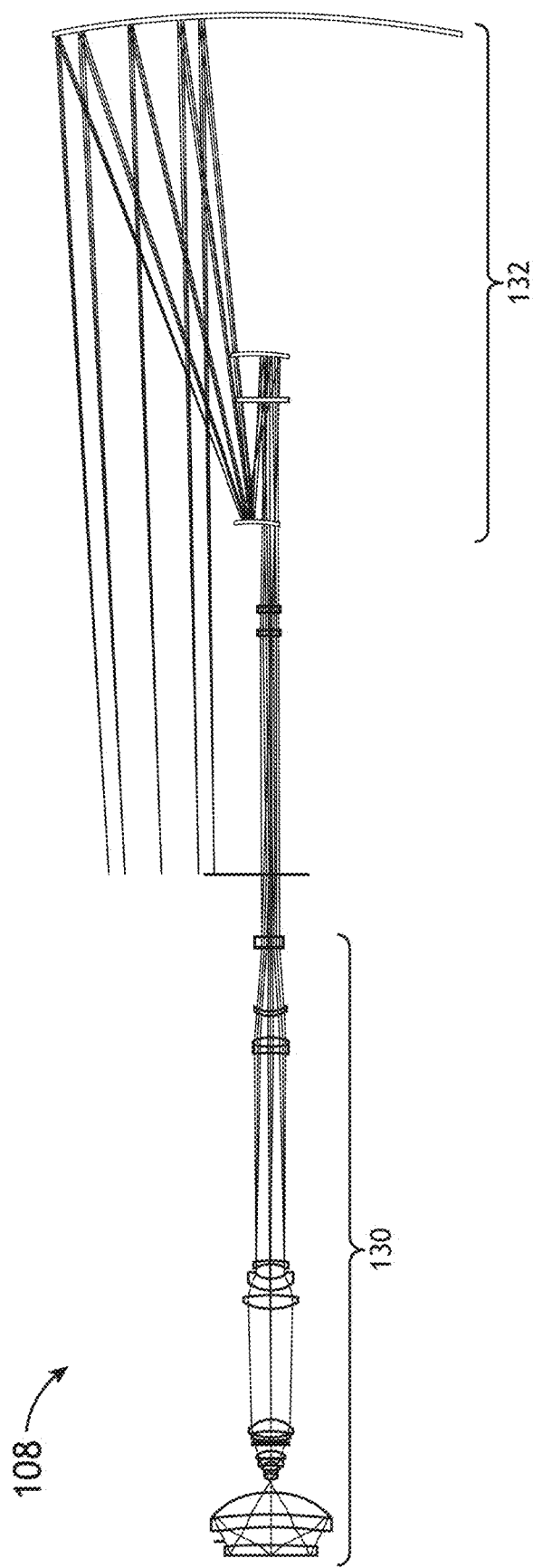
FIG. 2 is an illustration depicting an optical layout of an exemplary imaging objective configured in accordance with an embodiment of the present disclosure.
Figure 3:
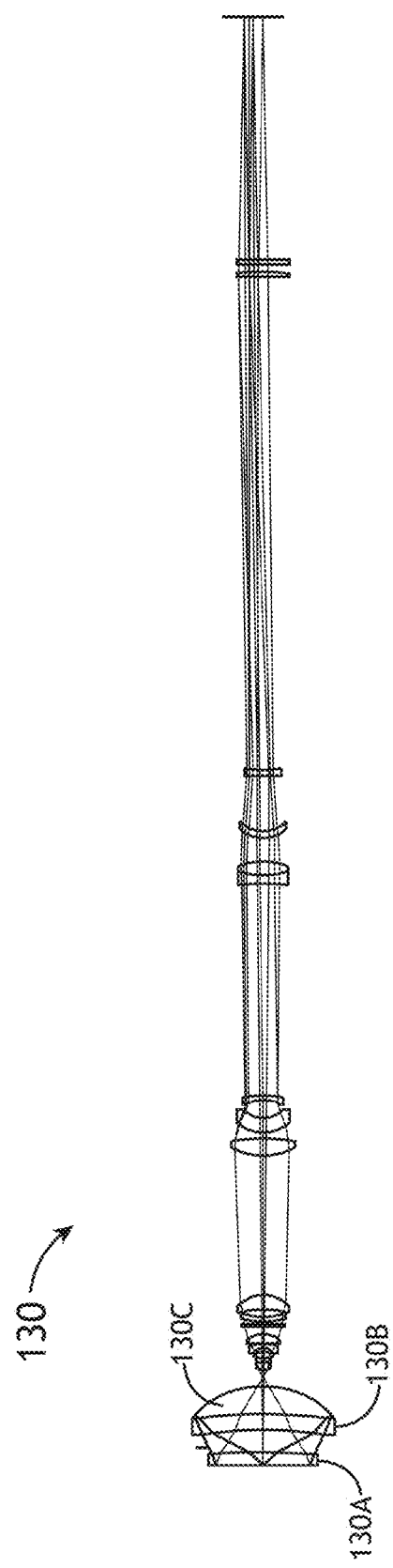
FIG. 3 is an illustration depicting a portion of the optical layout shown in FIG. 2.
Figure 4:
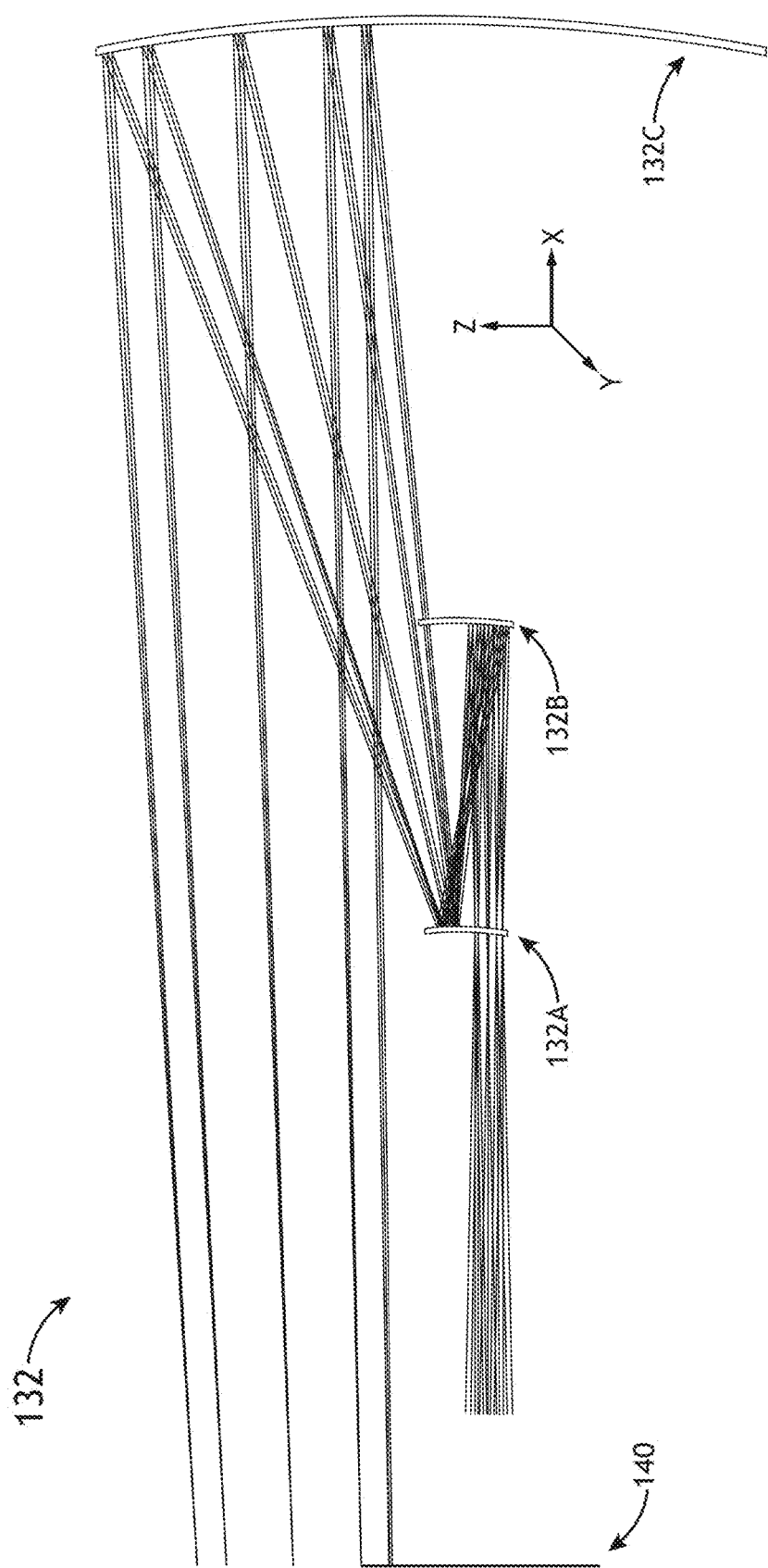
FIG. 4 is an illustration depicting another portion of the optical layout shown in FIG. 2.

Referring now to FIGS. 2-4, illustrations depicting an exemplary implementation of an imaging objective 108 configured in accordance with the present disclosure are shown. The imaging objective 108 may include a front objective 130 and a relay (which can also act as a zoom optics, and may therefore be referred to as a zoom relay) 132. In some embodiments, the front objective 130 is placed before the intermediate image as shown in FIG. 3 and has an objective head that includes: (1) a plano-convex lens 130A with the plano side also serving as reflecting surface, (2) a meniscus lens 130B, and (3) a concave mirror 130C, as well as a series of refractive fused silica and calcium fluoride lenses.

It is contemplated that the front objective 130 may be configured differently from the configuration depicted in FIGS. 2-4 without departing from the spirit and scope of the present disclosure. It is contemplated that while specific implementations of the front objective 130 may vary, it may still be adjusted (optimized) to provide diffraction limited performance (e.g., having a Strehl ratio of 0.9 or better, and in some embodiments, having a Strehl ratio of 0.5 or better) at the intermediate image. The intermediate image may then be magnified by a reasonably large value, e.g., 50×, such that the numerical aperture (NA) at the intermediate image plane is reduced to a relatively small value, e.g., 0.2 or less. It is contemplated that the smaller NA makes it possible to achieve diffraction limited performance by optimizing the performance at the intermediate image. The smaller NA at the interface, which is the intermediate image plane, also makes the coupling of the front objective 130 and the zoom relay 132 relatively easy, so that the front objective 130 and the zoom relay 132 can be designed independently, while the interface at the intermediate image can be telecentric. Furthermore, it is noted that because the NA at the interface is small, the alignment tolerance of the zoom relay 132 and the front objective 130 is relatively loose, which may in turn allow the imaging objective 108 to be designed and manufactured in a cost-effective manner.

In some embodiments, it may be preferable to have the intermediate image being telecentric so that the aberration introduced by the zoom relay 132 can be minimized. In cases where the intermediate image cannot be telecentric, proper matching of pupil locations may be considered so that the aberration introduced by the zoom relay 132 can be optimized. FIG. 4 is a depiction illustrating an exemplary zoom relay 132 in detail.

As shown in FIG. 4, the zoom relay 132 may include three (partial) spherical mirrors 132A, 1328, and 132C, which can all move axially and vertically (e.g., in the Y and Z direction) to maintain a fixed image plane 140. It is noted that maintaining a fixed image plane 140 allows the sensor 110 to remain at a fixed location, which may be appreciated for various reasons. It is also noted that in some embodiments, the mirrors 132A, 1328, and 132C of the zoom relay 132 may be all reflective with no-obscuration. It is noted that obscuration is eliminated because obscuration can reduce the low to mid frequency signal response.

In some embodiments, the mirrors 132A, 1328, and 132C of the zoom relay 132 are configured with different curvatures. It is noted that by configuring the zoom relay 132 in this manner, a conjugate image plane relative to the intermediate image is created in the image path. If the field stop is placed at the conjugate image plane in the illumination path, which is automatically corrected for the aberrations, there is no need to optimize for the illumination from the field stop to the wafer conjugate. In other words, the illumination path design is now automatically completed.

Figure 5:
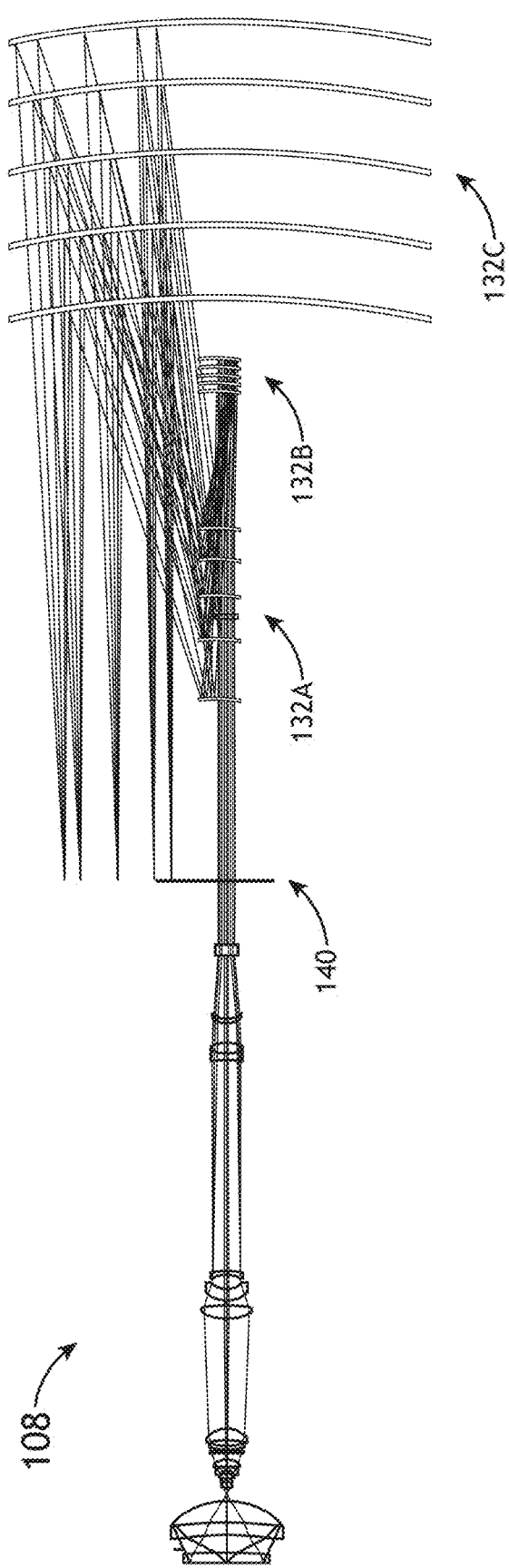
FIG. 5 is an illustration depicting an optical layout showing the overlay of multiple zoom configurations for various magnifications of the optical layout shown in FIG. 2.

In some embodiments, the relay is designed to cover a 2X zoom range. If a large zoom range is desired, the zoom range may be divided into multiple sub-zoom assemblies with each sub-zoom assembly implementing a three-mirror zoom relay 132 with aberrations corrected within that sub-zoom range. These zoom assemblies 132 may be configured to be switchable and can be utilized together to achieve a larger zoom range. It is noted that since the NA for the relay is relatively small (as previously described), the zoom assembly's tilt and placement tolerance can be relatively loose, which makes the replaceable zoom feasible. FIG. 5 is an illustration depicting multiple sub-zoom assemblies overlaid as described herein. It is noted that the mirror relay configured in this manner will enable automatic correction of the chromatic aberrations because of the all reflective design.

As will be appreciated from the above, imaging objectives configured in accordance with the present disclosure can provide perfect (diffraction limited) intermediate images, making it possible to provide implementations for confocal applications. Being diffraction limited also means that the margin assigned to aberration can be reduced accordingly, allowing inspection systems equipped with imaging objectives configured in accordance with the present disclosure to be more efficient with reduced lens heating and stray light. It is noted that since the NA at the intermediate image is relatively small, the integration tolerance is relatively loose, allowing the zoom relay and the front objective to be designed and tested independently. Additionally, since the zoom relay is configured to utilize all mirrors configured to have minimal scattering, stray light due to scattering may be reduced (which is an additional advantage of the all reflective relay design). Furthermore, since the number of mirrors needed to implement the zoom relay is reduced, the manufacturing cost of imaging objectives configured in accordance with the present disclosure can be reduced significantly as a result (e.g., the cost of low NA spherical mirrors is very low compared to refractive fused silica and calcium fluoride lenses), providing a feature that may be appreciated for various reasons.

It is to be understood that while the examples above referred to wafers as target substrates, such references are merely exemplary and are not meant to be limiting. It is contemplated that imaging objectives and inspection systems equipped with imaging objectives configured in accordance with the present disclosure are applicable to other types of polished plates as well without departing from the spirit and scope of the present disclosure. The term wafer used in the present disclosure may include a thin slice of semiconductor material used in the fabrication of integrated circuits and other devices, as well as other thin polished plates such as magnetic disc substrates, gauge blocks and the like.

It is also understood that the various blocks depicted in the figures are presented separately for illustrative purposes. It is contemplated that while the various blocks depicted in the figures may be implemented as separate (and communicatively coupled) devices and/or processing units, they may also be integrated together without departing from the spirit and the scope of the present disclosure.

It is believed that the system and the apparatus of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. An imaging objective, comprising:
   a front objective configured to produce an intermediate image of a portion of a semiconductor wafer disposed on a sample holder, wherein the intermediate image is formed from illumination from a laser-induced plasma source reflected from the portion of the semiconductor wafer disposed on the sample holder, wherein the front objective comprises:
   a lens with a plano side serving as a reflecting surface;
   a meniscus lens;
   a concave mirror; and
   a series of refractive fused silica and calcium fluoride lenses; and
   a relay configured to receive the intermediate image produced by the front objective, the relay comprising three spherical mirrors positioned to deliver a projection of the intermediate image to a fixed image plane.

2. The imaging objective of claim 1, wherein the intermediate image is diffraction limited.

3. The imaging objective of claim 1, wherein the relay is a three-mirror relay.

4. The imaging objective of claim 1, wherein the three spherical mirrors are all reflective mirrors with substantially no obscuration.

5. The imaging objective of claim 1, wherein the three spherical mirrors have different curvatures.

6. The imaging objective of claim 1, wherein the three spherical mirrors are moveable at least axially or vertically while still maintaining the projection of the intermediate image to the fixed image plane.

7. The imaging objective of claim 1, wherein the front objective is further configured to magnify the intermediate image to reduce a numerical aperture of the intermediate image at an interface between the front objective and the relay.

8. The imaging objective of claim 1, wherein a numerical aperture of the intermediate image at an interface is 0.2 or less.

9. The imaging objective of claim 1, wherein the intermediate image produced by the front objective is telecentric.

10. The imaging objective of claim 1, further comprising:
    at least one additional relay configured to receive the intermediate image produced by the front objective, the at least one additional relay comprising three spherical mirrors positioned to deliver a second projection of the intermediate image to the fixed image plane, wherein the at least one additional relay has a zoom range different from a zoom range of the first mentioned relay.

11. An inspection system, comprising:
    an illumination source, wherein the illumination source includes a laser-induced plasma source;
    a sample holder configured to hold a semiconductor wafer;
    a detector positioned at a fixed location within the inspection system; and
    an imaging objective configured to image the semiconductor wafer onto the detector, wherein the imaging objective comprises a front objective and a relay,
    wherein the front objective is configured to produce a diffraction limited intermediate image of a portion of the semiconductor wafer,
    wherein the relay is configured to receive the intermediate image produced by the front objective, the relay comprising three spherical mirrors positioned to deliver a projection of the intermediate image to the detector positioned at the fixed location.

12. The inspection system of claim 11, wherein the three spherical mirrors are all reflective mirrors with substantially no obscuration.

13. The inspection system of claim 11, wherein the three spherical mirrors have different curvatures.

14. The inspection system of claim 11, wherein the three spherical mirrors are moveable at least axially or vertically while still maintaining the projection of the intermediate image to the detector.

15. The inspection system of claim 11, wherein the front objective is further configured to magnify the intermediate image to reduce a numerical aperture of the intermediate image at an interface between the front objective and the relay.

16. The inspection system of claim 11, wherein a numerical aperture of the intermediate image at an interface is 0.2 or less.

17. The inspection system of claim 11, wherein the intermediate image produced by the front objective is telecentric.

18. The inspection system of claim 11, wherein the front objective comprises:
    a lens with a plano side serving as a reflecting surface;
    a meniscus lens;
    a concave mirror; and
    a series of refractive fused silica and calcium fluoride lenses.

19. The inspection system of claim 2, wherein the detector is a time delay integration (TDI) detector.

20. The inspection system of claim 11, further comprising:
    at least one additional relay configured to receive the intermediate image produced by the front objective, the at least one additional relay comprising three spherical mirrors positioned to deliver a second projection of the intermediate image to the detector positioned at the fixed location, wherein the at least one additional relay has a zoom range different from a zoom range of the first mentioned relay.

21. An imaging objective, comprising:
a front objective configured to produce a diffraction-limited intermediate image of a portion of a semiconductor wafer disposed on a sample holder, wherein the intermediate image is formed from illumination from a laser-induced plasma source reflected from the portion of the semiconductor wafer disposed on the sample holder; and
a relay configured to receive the intermediate image produced by the front objective, the relay comprising three spherical mirrors positioned to deliver a projection of the intermediate image to a fixed image plane, the three spherical mirrors being all reflective mirrors with substantially no obscuration, the three spherical mirrors being further configured to have different curvatures with respect to each other.

22. An imaging objective, comprising:
a front objective configured to produce an intermediate image of a portion of a semiconductor wafer disposed on a sample holder, wherein the intermediate image is formed from illumination from a laser-induced plasma source reflected from the portion of the semiconductor wafer disposed on the sample holder; and
a relay configured to receive the intermediate image produced by the front objective, the relay comprising three spherical mirrors positioned to deliver a projection of the intermediate image to a fixed image plane, wherein the three spherical mirrors are moveable at least axially or vertically while still maintaining the projection of the intermediate image to the fixed image plane.

\* \* \* \* \*